Figure 1:
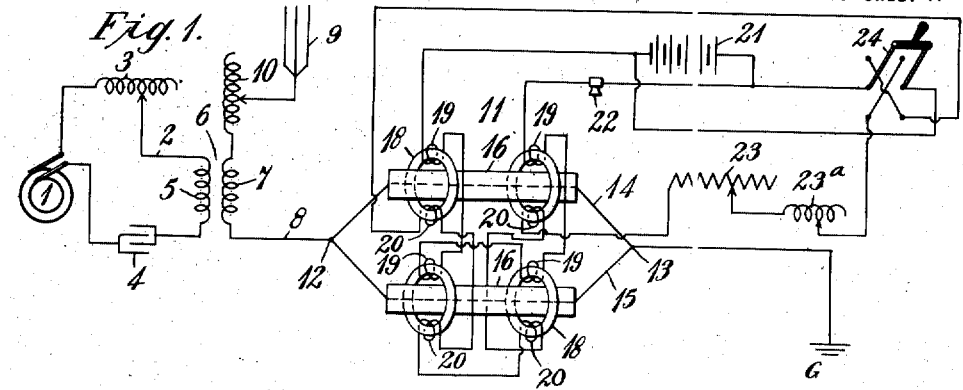

J. C. ARMOR.
SYSTEM OF SPACE SIGNALING.
APPLICATION FILED JULY 26, 1912.

1,219,215.

Patented Mar. 13, 1917.
2 SHEETS—SHEET 1.

WITNESSES:
Fred H Miller
D H Mac

INVENTOR
James C. Armor
BY
Wiley E. Carr
ATTORNEY

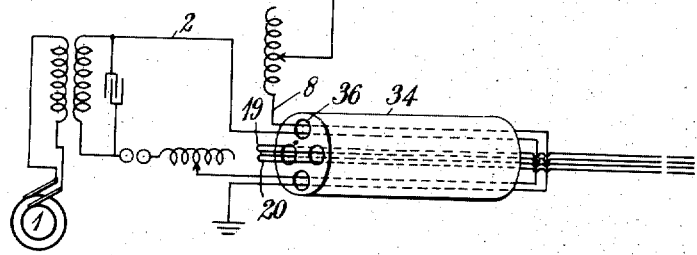
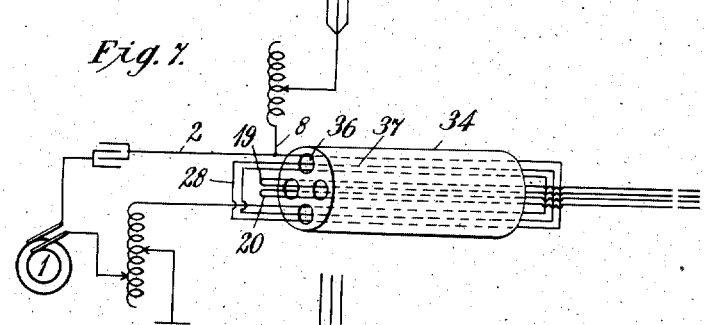
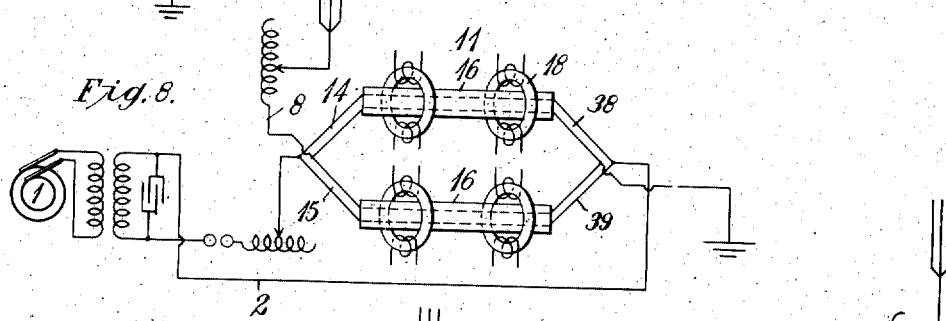
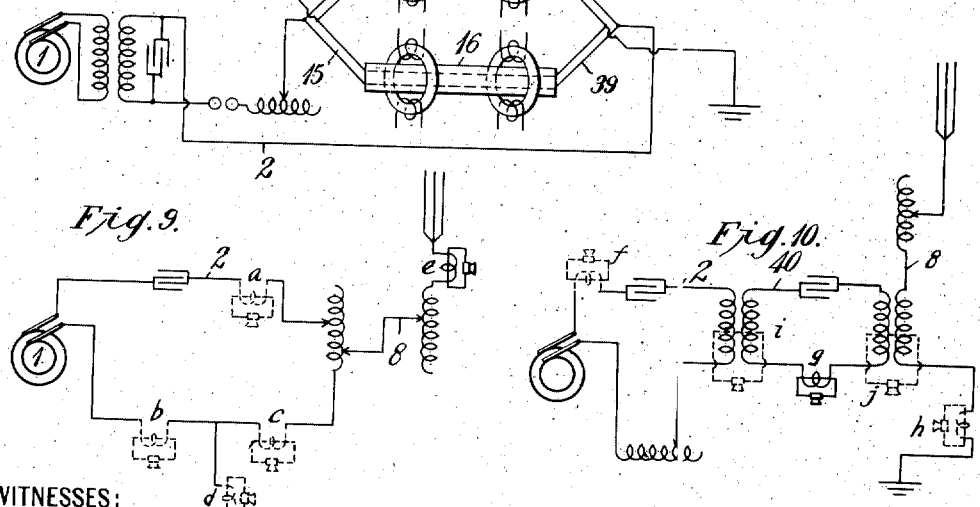

UNITED STATES PATENT OFFICE.

JAMES C. ARMOR, OF BROOKLYN, NEW YORK, ASSIGNOR TO GENERAL ELECTRIC COMPANY, A CORPORATION OF NEW YORK.

SYSTEM OF SPACE SIGNALING.

1,219,215. Specification of Letters Patent. Patented Mar. 13, 1917.

Application filed July 26, 1912. Serial No. 711,620.

*To all whom it may concern:*

Be it known that I, JAMES C. ARMOR, a citizen of the United States, and a resident of Brooklyn, in the county of Kings and State of New York, have invented a new and useful Improvement in Systems of Space Signaling, of which the following is a specification.

My invention relates to systems of space signaling and it has particular reference to the transmitting station of a system of wireless telephony.

One of the objects of my invention is to provide a system of the above-indicated character which shall be simple in arrangement, effective, efficient and powerful in operation and shall embody means for effecting variations in the frequency or the amplitude, or both, of the electromagnetic waves that are radiated into space from the antenna, in response to acoustic vibrations produced by sound or, in particular, by articulate speech.

Another object of my invention is to embody, in a system such as just referred to, inductive means, the inductance of which may be varied in accordance with sound waves produced by speech.

Another object of my invention is to provide means whereby the inductance of suitable inductive devices may be rendered dependent upon the current of an auxiliary circuit which includes a transmitting device similar to the well-known microphone transmitter, or other suitable device for effecting changes in resistance of an electric circuit in response to vibrations produced by speech.

A still further object of my invention is to provide adequate electrical means whereby the normal inductance of the inductive means referred to, may be maintained at approximately a predetermined value.

In the prior art, it has been customary, in systems of wireless telephony, to employ a transmitting device directly in the antenna or the oscillation circuit, whereby variations in the amplitude or intensity of the high-frequency oscillations are effected directly by reason of the varying resistance of the transmitter, as will be readily understood.

According to my invention, I propose to vary either the frequency or the amplitude, or both, of the electrical oscillations and, in so doing, I employ a magnetizable core which is associated or linked with the high-frequency sending circuit and which is provided with a plurality of windings which are supplied with energy from an auxiliary direct-current source. One of the windings is included in circuit with a reversing switch, an inductance and a variable resistance whereby the magnetizing current may be adjusted in order to maintain the core at any particular flux density or degree of saturation, and the other winding is connected in circuit with a transmitting device by means of which the current may be varied in response to speech, whereby variations in the inductance of the magnetizable core are effected. In this way, the frequency or the amplitude, or both, depending upon the location of my inductive device as hereinafter pointed out, of the electrical oscillations and, therefore, of the electromagnetic waves radiated into space, is varied in accordance with well-known principles and the signals transmitted are rendered responsive to the sounds or speech which affect the transmitting device.

In one of its aspects my invention may be considered as embodying a method of and means for amplifying variable currents in the sense that the variations of the current flowing in the controlling circuit are reproduced in much greater amplitude by the current which is controlled even though the controlled current may be of an entirely different form from the controlling current.

It is well known that if a current of constant value be supplied to an oscillation circuit and the frequency thereof be gradually increased, the current in the antenna circuit increases to a maximum and then gradually decreases. If these values be plotted, a peaked curve is obtained, the peak occurring when the frequency is that for which the antenna circuit is tuned and the slope thereof depending upon the electrical characteristics of the antenna circuit. Inasmuch as the energy radiated from the antenna is a function of the antenna current, it is evident that the intensity or amplitude of the radiated waves may be varied according to the variations in frequency which may be effected by speech through the agency of my inductive device.

I propose, therefore, to maintain the normal inductance of my inductive device at such a value that the antenna and the oscillation circuit shall not have exactly the same natural period and to work entirely on one side of the peak of the curve hereinbefore mentioned, so that increases in frequency due to increases in inductance caused by sound waves in the transmitter will cause corresponding increases in the antenna current and, hence, in the intensity or amplitude of the energy radiated, and vice versa. Moreover, I propose to work at substantially the steepest portion of the curve where a very considerable change in the radiated energy may be effected by an extremely slight variation in the frequency, it being understood that the radiated energy varies as the square of the antenna current.

It should be understood that, with my inductive device in the oscillation circuit and a loose coupling between the oscillation circuit and the antenna circuit, the antenna will always oscillate at its own natural frequency, regardless of changes of frequency in the oscillation circuit and, hence, variations in the intensity or amplitude only of the waves radiated will be effected. If the device is connected in the antenna circuit, however, the frequency also of the waves radiated into space will be changed in response to speech.

In case a close coupling is employed, variations in the frequency of the radiated waves are effected with the inductive device in either the oscillation or the antenna circuit. Perhaps the best arrangement is to employ a loose coupling and connect the inductive device in the antenna circuit, whereby changes of both the amplitude and the frequency of the radiated waves are effected, thereby strengthening or enhancing the effect on the receiving station which, of course, must be sharply and selectively tuned.

It should be understood that in using the term "non-inductive relation" in connection with the high frequency and the direct current windings, I mean that the flux produced by the one does not pass through or link the other and, hence, does not induce a voltage therein, in accordance with well known principles. The inductance of the high frequency circuit, however, may be varied by changes in the direct current, inasmuch as such changes affect the magnetization or saturation of the core.

Figure 2:
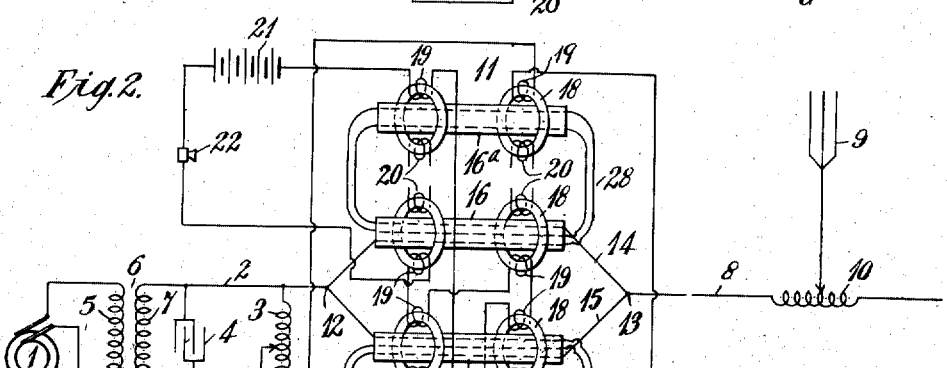
Figure 3:
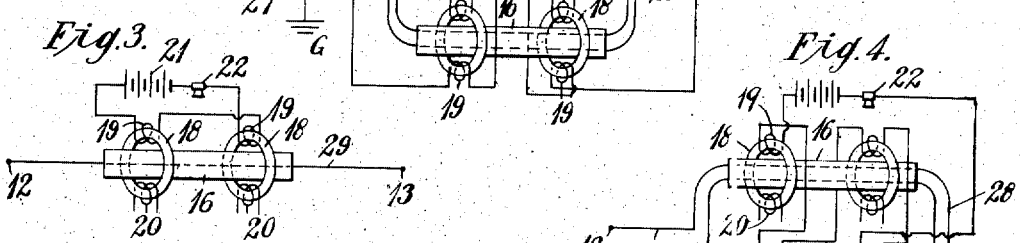
Figure 4:
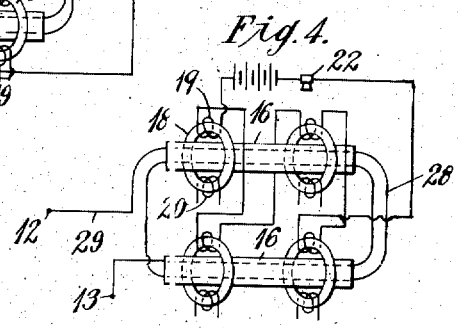
Figure 5:
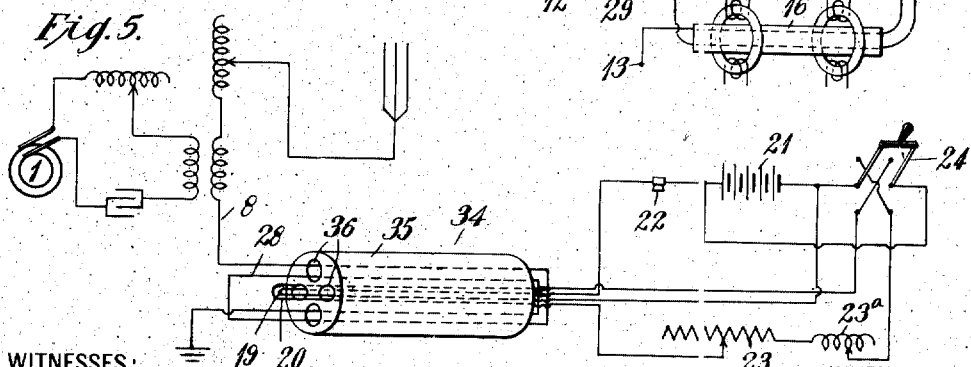

My invention may best be understood by reference to the accompanying drawings, in which Figure 1 is a diagrammatic view of a transmitting system embodying my invention; Fig. 2 is a diagrammatic view similar to Fig. 1, illustrating a modified form of my inductive means; Figs. 3 and 4 are also diagrammatic views showing further modifications in the arrangement of devices and circuits of my inductive means; Fig. 5 is a view similar to Fig. 1 illustrating an inductive device which constitutes the preferred embodiment of my invention, this device being connected in the antenna circuit; Fig. 6 is a diagrammatic view similar to Fig. 2 showing the preferred form of my inductive device connected as a coupling link between the oscillation and the antenna circuits; Fig. 7 illustrates my preferred form of inductive device connected as an auto-transformer in the antenna and oscillation circuits; Fig. 8 is a view similar to Fig. 2 showing inductive means of a similar form to that shown in Fig. 1 and connected as a coupling link between the antenna and the oscillation circuit; Fig. 9 is a diagrammatic view of a typical transmitting system showing various locations of my inductive means by a conventional symbol for variable inductance, and Fig. 10 is also a diagrammatic view of another typical arrangement of circuits of a transmitting system in which the various locations of my inductive means are indicated in the same manner as in Fig. 9.

Referring to Fig. 1, a generator 1 adapted to generate alternating current of from thirty thousand to two hundred thousand oscillations per second delivers energy to an oscillation circuit 2 which includes an adjustable inductance 3, a condenser 4 and a primary winding 5 of a transforming device 6. A secondary winding 7 of the transforming device 6 is connected in an antenna circuit 8 between an antenna 9 and the ground G and in circuit with an adjustable inductance 10 and my variable inductive means 11.

The generator 1 is merely illustrative of any suitable source of high-frequency oscillations, and, by suitably arranging the devices and circuit connections of the oscillation circuit, any other suitable source of energy may be employed, such as the well known Poulsen arc. Moreover, I do not wish to be restricted to the specific arrangements, circuit connections and relationships of the source of energy, the oscillation and the antenna circuits, as, broadly considered, I contemplate employing any of the well-known arrangements of circuits in this art.

The antenna circuit 8 is divided at points 12 and 13 into a plurality of branch circuits 14 and 15 which are surrounded, respectively, by means of suitable tubes 16 of insulating material, such as mica or other material of high dielectric strength. Each of the tubes 16 is surrounded or linked by a plurality of magnetizable cores 18, preferably in the form of rings and which are preferably composed of a plurality of small wires or thin laminations in order to prevent excessive heating. Each of the cores 18 is provided with a plurality of windings 19 and 20 and the several windings 19 are connected in opposition across the terminals of an auxiliary battery 21 and in circuit with a transmitting device 22 which may conveniently take the form of the usual microphone telephone transmitter.

The several windings 20 are also connected in opposition across the battery 21 and in circuit with an adjustable resistance 23, an adjustable inductance 23ᵃ and a reversing switch 24. The reason for connecting the several windings 19 and 20 in opposition is to prevent any high frequency oscillations from being induced in the direct current windings which would interfere with the operation and defeat entirely the purpose of the invention. The adjustable inductance 23ᵃ is employed in order to prevent fluctuations of current in the windings 20 which might, otherwise, be caused by the variations of current in the transmitter circuit. Hence, the current in the winding 20 is maintained substantially constant.

Assuming the circuit connections to be as shown and the high-frequency generator 1, or other suitable source of energy, to be producing electrical oscillations of the desired frequency in the oscillation circuit 2, the operation of the system is as follows:

The reversing switch 24 is first closed upon the proper contact terminals in order to complete a circuit through the windings 20 of the several cores 18, after which the resistance 23 is adjusted until the current which traverses the circuit is the proper amount to saturate the cores sufficiently to produce an inductance therein which shall render the antenna circuit almost in tune or in resonance with the oscillation circuit. In some cases, the total inductance may be included in my variable inductive means, while, under other circumstances, it may be necessary to employ the auxiliary adjustable inductance 10. In either case, the antenna circuit is tuned to approximately resonant conditions, and the inductance thereof maintained substantially constant, so that the system shall work under the most advantageous conditions, whereby effective and reliable operation may be secured.

If the current traversing the windings 19 is varied by means of the transmitter 22 in response to sounds or speech, in accordance with well-known practice, it is evident that the degree of saturation of the cores 18 and, therefore, the inductance in the antenna circuit is varied above and below the predetermined value for which the antenna circuit is tuned. By means of these variations in inductance in response to speech, the frequency and amplitude of the oscillations radiated from the antenna are accordingly varied.

Inasmuch as the branch circuits 14 and 15 of the antenna circuit form a closed loop, it is evident that there will be slight circulating currents produced by reason of the changes of flux in the cores 18, but these circulating currents will be very small and will not have any damaging effect upon the operation of the system.

Referring to Fig. 2, the generator 1 is adapted to deliver alternating current, at a frequency of from twelve hundred to six thousand cycles per second, to the primary winding 5 of the transforming device 6, the secondary 7 of which is connected across the condenser 4 and in circuit with the adjustable inductance 3 and a spark gap 27. The spark gap 27 may be of any well-known type of construction and is adapted to discharge the condenser 4 periodically, whereby a series of very high frequency oscillations are produced in the oscillation circuit 2.

The particular means whereby the high-frequency oscillations are produced, forms no part of my invention except as it performs a useful function in the operation of the system, and any suitable means for producing the same results may be employed.

The variable inductive means 11 which is connected in the antenna circuit 8 between the antenna 9 and the oscillation circuit 2 is of the same general form as that described with respect to Fig. 1, but differs therefrom in that the branch lines 14 and 15 are severally provided with a plurality of turns or loops 28 which are threaded through the plurality of insulating tubes 16 and 16ᵃ. These tubes are surrounded by magnetizable cores 18 which are provided with a plurality of windings 19 and 20 in the same manner as hereinbefore described. The windings 19 are connected in opposition across the battery 21 and in circuit with the transmitter 22 and the windings 20 may be connected in the same manner as set forth in Fig. 1. The latter connections are omitted for the purpose of clearness, it being believed that those skilled in the art will readily understand the circuit connections thereof.

The arrangement of circuits set forth in Fig. 2 may be found desirable under certain conditions and, inasmuch as the operation of the system is similar to that already described in detail, no further description thereof is deemed necessary. Obviously, circulating currents will also be established in the loop comprising the branch circuits 14 and 15.

In Fig. 3 a portion 29 of the antenna circuit is shown threaded through a single straight insulating tube 16 which is provided with cores 13 having windings 19 and 20 which are connected in the same manner as already described.

Fig. 4 shows another modified arrangement of circuits for my variable inductive means in which a portion 29 of the antenna circuit is threaded through a plurality of insulating tubes 16 to form a plurality of turns 28, and said tubes 16 are also provided with cores 18 having windings 19 and 20 which are connected in the manner hereinbefore set forth. Since there are no closed loops of the antenna circuit in the circuits shown in Figs. 3 and 4, no circulating currents are produced.

Referring now to Fig. 5, a transmitting system embodying similar devices and circuit connections to those shown in Fig. 1, is provided with a modified form of inductive device 34 which constitutes the preferred embodiment thereof. The inductive device 34 comprises a magnetizable core 35 which is preferably composed of a plurality of insulated laminations or punchings (not shown) which are provided with a plurality of openings or apertures 36 that are disposed in pairs at right angles, the one to the other. The antenna circuit 8 is threaded through one pair of apertures 36 in a plurality of turns 28, while two direct current windings 19 and 20 are disposed in the other set of apertures which are at right angles thereto.

Inasmuch as the antenna winding 8 and the direct current windings 19 and 20 are disposed at right angles, it is evident that they are non-inductively related in the sense already defined and, hence, there will be no tendency for alternating high frequency oscillations to be impressed upon the direct current windings.

The winding 19 is connected across the terminals of the battery 21 and in circuit with the transmitter 22, while the winding 20 is connected across the battery 21 and in circuit with the reversing switch 24, the inductance 23ᵃ and the adjustable resistance 23.

The operation of this system is substantially like that already described, it being understood that the normal inductance of the inductive device 34 is maintained at approximately a predetermined value by means of the direct current winding 20, and variations above and below this normal value are effected in accordance with sound waves produced by speech through the agency of the winding 19 and the transmitting device 22. Hence, the frequency and the amplitude of the oscillations and, therefore, of the electromagnetic waves radiated from the antenna, are accordingly varied.

In Fig. 6, a transmitting system similar to that shown in Fig. 2 is set forth, in which the preferred form of my inductive device 34 is linked through both the oscillation circuit 2 and the antenna circuit 8 and thus serves as a transforming device or a coupling link between said circuits. The oscillation circuit 2 and the antenna circuit 8 are insulated, one from the other, and are inductively related, being threaded through one pair of apertures 36 of the inductive device 34. Direct-current windings 19 and 20 are also provided and are disposed in the other set of apertures 36 which are located substantially at right angles to the set just referred to.

In Fig. 7, my inductive device 34 is associated with the oscillation circuit 2 and the antenna circuit 8, being connected as an auto-transformer, which serves as a coupling link between the circuits mentioned. The conductor 37 which forms a common circuit for both the oscillation circuit 2 and the antenna circuit 8 is provided with a plurality of turns 28 which are disposed in one set of apertures 36.

Direct-current windings 19 and 20 are also provided and are located in the remaining set of apertures 36 and are thus non-inductively related to the alternating current circuit 37.

The auxiliary connections of the direct current windings 19 and 20 in both Figs. 6 and 7 have been omitted for the reason that these connections have been fully described and it is deemed unnecessary to set forth the same in detail again.

It will be understood that as the currents in the direct-current windings 19 and 20 are varied, either by adjustment or by small increments in response to speech, that variations in the mutual inductance of the oscillation and the antenna circuits are effected, whereby changes in frequency and in amplitude of the oscillations may be accomplished.

Fig. 8 shows a system similar in its main circuit connections to that shown in Fig. 6 and, in place of the preferred form of my inductive device 34, I have illustrated the form shown in Fig. 1 which is so connected as to serve as a coupling link between the oscillation circuit 2 and the antenna circuit 8.

Not only are the conductors 14 and 15 of the antenna circuit threaded through the several insulating tubes 16, but a plurality of branch lines 38 and 39 of the oscillation circuit 2 are also disposed within said insulating tubes and, inasmuch as said tubes are surrounded by inductive cores 18, in the manner hereinbefore set forth, it is evident that the antenna and the oscillation circuits are inductively related and that the inductive means 11 serves as a coupling link between them.

In general, the operation of this system is similar to that already set forth and further description thereof is deemed unnecessary.

In Fig. 9, I have shown a typical arrangement of circuits of a transmitting system such as is frequently employed in the art, and I have illustrated symbolically my inductive means connected in various locations $a$, $b$, $c$, $d$ and $e$ which said means may occupy to effectively accomplish the desired results, all but one of such inductive means being indicated by broken lines.

When inserted in the system at *a* or *b*, the inductive means is connected in the oscillation circuit 2, when connected at *c* it is included in both the oscillation circuit 2 and the antenna circuit 8, while if located at *d* or *e*, it forms a part of the antenna circuit only.

In Fig. 10, another typical arrangement of circuits such as are frequently employed is illustrated, in which a specially tuned circuit 40 is employed between the oscillation circuit 2 and the antenna circuit 8, for the purpose of transferring energy between them. Here again I have illustrated symbolically various locations *f*, *g*, *h*, *i* and *j* in which my inductive means may be connected, all but one of such means being indicated by broken lines. If included in the circuit at *f*, the inductive means forms a part of the oscillation circuit 2; if at *g*, it constitutes a part of the specially tuned circuit 40, and if at *h*, it constitutes an element in the antenna circuit 8. My device may also be included at *i* or *j*, in which cases it serves as a coupling link between the several adjacent circuits.

In connection with Figs. 9 and 10, I have not attempted to show the circuit connections of my inductive means, nor shall I attempt to describe the operation, for the reason that these details have been fully set forth hereinbefore and those skilled in the art will readily understand the various circuit connections that may be employed and the operation of the systems.

Although I have shown and described my invention as embodied in several different arrangements and locations of devices and circuits, my invention is not confined alone to the particular arrangements set forth and many modifications may be effected therein without departing from the spirit and scope of my invention.

I claim as my invention:

1. The method which consists in producing a magnetizing field by means of a variable electric current, producing a high frequency alternating current and subjecting the high frequency alternating current to the action of said magnetizing field in such a manner that the variable current circuit will be unaffected by the high frequency alternating current.

2. The method which consists in subjecting two magnetic circuits to the action of a pulsating current, producing a high frequency alternating current, and conducting said high frequency alternating current within the influence of said magnetic circuits in such a manner that the magnetizing effects of the alternating current upon the two magnetic circuits are substantially equal and opposite.

3. The method which consists in producing by a variable electric current two magnetizing fields, producing a high frequency alternating current, and subjecting said high frequency alternating current to the action of said magnetizing fields in such a manner that the electromotive forces induced in the circuit of said variable electric current by the high frequency alternating current are substantially equal and opposite, simultaneously producing by a constant direct current two other magnetizing fields and superimposing said last mentioned magnetizing fields upon the first mentioned magnetizing fields.

4. The method of amplifying a pulsating unidirectional current which consists in producing a magnetizing field by means of said current, producing a high frequency alternating current, and subjecting said high frequency alternating current to the action of said magnetizing field in such a manner that the pulsating unidirectional current circuit will be unaffected by the high frequency alternating current.

5. The method of amplifying a varying electric current which consists in producing by said varying electric current two magnetizing fields, producing a high frequency alternating current, and subjecting said high frequency alternating current to the action of said magnetizing fields in such a manner that the magnetizing effects of the alternating current upon the varying electric current circuit are opposite.

6. The method of amplifying a variable electric current which consists in producing a magnetizing field by means of said current, producing a second magnetizing field by means of a constant direct current, producing a high frequency alternating current and subjecting said high frequency alternating current to the action of said magnetizing fields in such a manner that the circuits producing said magnetizing fields will be unaffected by the high frequency alternating current.

7. The method of controlling the flow in an electric circuit of a high frequency alternating current which consists in producing by a controlling electric current two magnetizing fields and subjecting the high frequency alternating current flowing in the circuit to the action of said magnetizing fields in such a manner that the magnetizing effects of the alternating current upon the controlling current circuit are opposite.

8. The method of controlling the flow in an electric circuit of a high frequency alternating current which consists in producing by a varying electric current two magnetizing fields and subjecting the high frequency alternating current flowing in the circuit to the action of said magnetizing fields in such a manner that the electromotive forces induced in the circuit of said varying electric current by the high frequency alternating current are substantially equal and opposite.

9. The method of controlling the flow in an electric circuit of a high frequency alternating current which consists in producing by a controlling electric current two magnetizing fields, subjecting the high frequency alternating current flowing in the circuit to the action of said magnetizing fields in such a manner that the magnetizing effects of the alternating current upon the two magnetizing fields are opposite, simultaneously producing by a constant direct current two other magnetizing fields, and superimposing said last mentioned magnetizing fields upon the first mentioned magnetizing fields.

10. An apparatus of the character described, comprising two magnetic cores, a winding on each of said cores arranged to carry a pulsating unidirectional electric current, and a second winding linked with each of said cores and arranged to carry an alternating current of a frequency higher than the pulsations of said unidirectional current, the corresponding windings of each core being connected in series and so that the electromotive forces induced in the unidirectional current carrying windings by the action of the alternating current are substantially equal and opposite.

11. An apparatus of the character described comprising two magnetic cores, a winding on each of said cores for carrying a pulsating unidirectional current, a second winding linked with each of said cores for carrying a high frequency alternating current, the windings being so related to each other that the circuit supplying the pulsating current will be unaffected by the high frequency alternating current, and a third winding on each of said cores for imparting an initial constant megnetization.

12. An apparatus of the character described, comprising two magnetic cores, a coil wound on each of said cores for carrying a pulsating unidirectional electric current and a second coil wound on each of said cores arranged to carry an alternating current of a frequency higher than the pulsations of said unidirectional current, the corresponding coils of each core being connected in series and so that the magnetizing relation of the coils of one core is opposite to the magnetizing relation of the coils of the other core.

13. An apparatus of the character described, comprising two magnetic cores, a winding on each of said cores for carrying a controlling electric current, a second winding linked with each of said cores for carrying a high frequency alternating current, the windings being so related to each other as to prevent high frequency current from flowing in the circuit supplying the controlling current and a third winding on each of said cores for imparting an initial magnetization.

14. An apparatus of the character described, comprising two magnetic cores, a winding on each of said cores for carrying a controlling electric current, a second winding linked with each of said cores for carrying an alternating current, the corresponding windings of each core being connected in series and so that the magnetizing relation of the windings of one core is opposite to the magnetizing relation of the windings of the other core, and a third winding on each of said cores for imparting to said cores an initial magnetization.

15. Means for controlling the flow of high frequency alternating current in an electric circuit comprising two magnetic cores, a winding for each of said cores supplied by a controlling electric current, a second winding on each of said cores supplied by a constant direct current, and means for subjecting the alternating current to the action of the magnetic field produced by said windings in such a way that the electromotive force induced in each of said windings by the alternating current are substantially equal and opposite.

16. Means for controlling the flow in an electric circuit of a high frequency alternating current comprising a magnetizing field produced by a controlling current, a second magnetizing field coöperating with the first and produced by a constant direct current and means for subjecting the high frequency alternating current to the action of these fields in such a manner that the circuits producing said magnetizing fields will be unaffected by the high frequency alternating current.

17. Means for controlling the flow in an electric circuit of a high frequency alternating current comprising a magnetizing field produced by a pulsating unidirectional current, a second magnetizing field coöperating with the first and produced by a constant direct current and means for subjecting the high frequency alternating current to the action of these fields in such a manner as to prevent high frequency alternating currents from flowing in the circuits producing said fields.

18. Means for amplifying a variable electric current comprising a magnetizing field produced by the variable current, a circuit supplied by a source of high frequency alternating current and means for subjecting said high frequency alternating current to the action of said magnetizing field in such a manner that the variable current circuit will be unaffected by the high frequency alternating current.

19. An apparatus for amplifying a pulsating unidirectional electric current, comprising a source of high frequency alternating current, a circuit supplied by said source, two reactances included in said circuit, and two magnetizing coils adapted to carry the current to be amplified and inductively related to said reactances in such a manner that the electromotive forces induced in the two magnetizing coils by the action of the alternating current are substantially equal and opposite.

20. Means for amplifying a variable electric current comprising a magnetizing field produced by the variable current, a second magnetizing field coöperating with the first and produced by a source of constant direct current, a circuit supplied by a source of high frequency alternating current and means for subjecting said high frequency alternating current to the action of said magnetizing fields in such a manner that the circuits producing said magnetizing fields will be unaffected by the high frequency alternating current.

21. The combination with a high frequency electrical circuit of magnetizable members linking said circuit, magnetizing windings supplied by a controlling current associated with said members and so related to the alternating current circuit as to prevent high frequency electrical currents from flowing in the circuit supplying the controlling current.

22. The combination with a high frequency electrical circuit of magnetizable members linking said circuit, a magnetizing winding for each of said members, a source of energy for supplying a controlling current for said magnetizing windings in series, the windings being so related to the alternating current circuit that the high frequency electromotive forces induced in said windings are substantially equal and opposite.

23. The combination with a high frequency electrical circuit, of magnetizable rings linking said circuit, magnetizing windings associated with said rings and connected in opposition in two separate circuits, a source of energy connected to said two circuits, and means for varying the current delivered thereby to one of said circuits in response to sound waves.

24. The combination with an electrical circuit supplied by a source of high frequency alternating current of means for controlling the flow of current in that circuit comprising means for producing by a constant direct current a magnetizing field, and means for producing by a controlling current a second magnetizing field coöperating therewith.

25. The combination with an electrical circuit supplied by a source of high frequency alternating current, of means for controlling the flow of current in said circuit comprising means for producing by a constant direct current a magnetizing field, means for producing by a controlling current a second magnetizing field coöperating with the first, and means for subjecting a high frequency alternating current to the action of these fields in such a manner as to prevent high frequency alternating currents from flowing in the circuits producing said fields.

26. The combination with a high frequency electrical circuit of magnetizable members linking said circuit, two sets of magnetizing windings for said magnetizable members, one set of said windings being supplied by a constant direct current and the other set being supplied by a controlling current, the two sets of windings being so related to the alternating current circuit as to prevent high frequency alternating currents from flowing in the circuits supplying the windings.

27. The combination with an electric circuit supplied by a source of high frequency alternating current, of means for controlling the flow of current in that circuit comprising magnetizable members linking said circuit, two sets of magnetizing windings for each of said magnetizable members, one set of said windings being supplied by a constant direct current and the other set being supplied by a controlling current, the two sets of windings being so related to the alternating current circuit that the high frequency electromotive forces induced therein will be substantially equal and opposite.

28. In a wireless signaling system, the combination of an antenna circuit supplied by a source of high frequency energy, a magnetizable member associated with said antenna circuit, two sets of windings for said magnetizable member, a source of direct current connected to said windings and means for varying the current supplied to one set of said windings.

29. In a wireless signaling system, the combination of an antenna circuit supplied by a source of high frequency energy, magnetizable members associated with said antenna circuit, a source of direct current, two sets of windings for each of said members adapted to be energized by said direct current source and connected in opposition, and means for varying the current supplied to one set of said windings.

30. In a wireless signaling system the combination with a high frequency source of energy, an oscillation circuit associated therewith and an antenna circuit in coöperative relation with said oscillation circuit, of two magnetizable members associated with said antenna circuit, a source of direct current, two sets of windings for each of said members, the windings of each set being connected in opposition and in series circuit with said direct current source and means for varying the current traversing one of said sets of windings.

31. In a wireless signaling system the combination with a high frequency source of energy, an oscillation circuit associated therewith and an antenna circuit in coöperative relation with said oscillation circuit, of magnetizable members associated with said antenna circuit, a source of direct current, a plurality of windings for each of said members, one set of windings on said members being connected in opposition and in series circuit with said direct current source, and in multiple circuit with another set of said windings, and means for varying the current through one set of said windings.

32. In a wireless signaling system, the combination with a high frequency source of energy, an oscillation circuit associated therewith and an antenna circuit in coöperative relation with said oscillation circuit, of inductive means associated with said antenna circuit, two sets of windings for said inductive means, a direct current source of energy connected to said windings in parallel, and means for varying the current supplied to one set of said windings.

33. In a system of wireless telephony, the combination of an antenna circuit supplied by a source of high frequency energy, inductive means associated with said antenna circuit, two sets of windings for said inductive means, a direct current source of energy connected to said windings in parallel, and a transmitter in circuit with one set of said windings.

34. In a system of wireless telephony, the combination of an antenna circuit supplied by a source of high frequency energy, inductive means associated with said antenna circuit, a source of direct current, a plurality of windings for said inductive means connected in opposition and adapted to be energized by said source of direct current, and means for varying the current traversing said windings in response to speech.

35. In a system of wireless telephony, the combination with a high frequency source of energy, an oscillation circuit associated therewith and an antenna circuit in coöperative relation with said oscillation circuit of inductive means associated with said antenna circuit, a source of direct current, a plurality of windings for said inductive means connected in opposition and adapted to be energized by said source of direct current, and a telephone transmitter in circuit with said windings.

36. In a system of wireless telephony, the combination with a high-frequency source of energy, an oscillation circuit associated therewith and an antenna circuit in coöperative relation with said oscillation circuit, of inductive means associated with one of said circuits, two sets of windings for said inductive means, a direct current source of energy connected to said windings in parallel, and a transmitter in circuit with one set of said windings.

37. In a system of wireless telephony, the combination with a high-frequency source of energy, an oscillation circuit associated therewith and an antenna circuit in coöperative relation with said oscillation circuit, of a magnetizable member associated with one of said circuits, two sets of windings therefor, a source of direct current connected to said windings, and a means for varying the current supplied to one set of said windings in response to speech.

38. In a system of wireless telephony, the combination with a high frequency source of energy, an oscillation circuit associated therewith and an antenna circuit in coöperative relation with said oscillation circuit, of a magnetizable member associated with said antenna circuit, two sets of windings therefor, a source of direct current connected to said windings and a telephone transmitter in circuit with one set of said windings.

39. In a system of wireless telephony, the combination with a high-frequency source of energy, an oscillation circuit associated therewith and an antenna circuit in coöperative relation with said oscillation circuit, of magnetizable members associated with one of said circuits, a source of direct current, a plurality of windings for said members adapted to be energized by said direct current source and connected in opposition, and means for varying the current supplied to said windings in response to speech.

40. In a system of wireless telephony, the combination with a high frequency source of energy, an oscillation circuit associated therewith and an antenna circuit in coöperative relation with said oscillation circuit, of magnetizable members associated with said antenna circuit, a source of direct current, a plurality of windings for said members adapted to be energized by said direct current source and connected in opposition, and a telephone transmitter in circuit with said windings.

41. In a system of wireless telephony, the combination with a high-frequency source of energy, an oscillation circuit associated therewith and an antenna circuit in coöperative relation with said oscillation circuit, of magnetizable members associated with one of said circuits, a source of direct current energy, a plurality of windings for each of said members, one set of said windings on said members being connected in opposition and in series circuit with said direct current source and in multiple circuit with another set of said windings, and means for varying the current traversing one of said sets of windings in response to speech.

42. In a system of wireless telephony, the combination with a source of high-frequency alternating current energy, an oscillation circuit and an antenna circuit, of an inductive device serving as a coupling between said oscillation and said antenna circuits and having a plurality of inductively related windings severally included in the aforesaid circuits, and means for maintaining a predetermined inductance of said device and for varying the inductance thereof in response to speech.

43. In a system of wireless telephony, the combination with a source of high-frequency alternating current energy, an oscillation circuit and an antenna circuit, of an inductive coupling between said oscillation and said antenna circuits, means embodying an auxiliary source of energy for maintaining a predetermined inductance of said coupling, and means embodying said auxiliary source and a transmitter for effecting changes in the inductance of said coupling.

44. In a wireless signaling system, the combination with an inductive device, an oscillation circuit, an antenna circuit and an auxiliary circuit, all linking said device, of means responsve to varying external conditions for changing the inductance of said device.

45. The combination in an apparatus of the character described of a transforming device having two magnetic circuits, a primary and a secondary winding for each magnetic circuit, a source of auxiliary magnetizing current adapted simultaneously to energize both magnetic circuits, a source of high frequency alternating current supplying said primary windings and means for varying the intensity of the auxiliary magnetizing current to correspondingly vary the amplitude of the high frequency current generated in the secondary windings.

46. The combination in an apparatus of the character described of a transforming device having two magnetic circuits, a primary and a secondary winding for each magnetic circuit, a source of auxiliary magnetizing current adapted simultaneously to energize both magnetic circuits, a source of high frequency alternating current supplying said primary winding, a circuit containing the secondary winding, the inductance capacity and resistance of said circuit being suitably proportioned to tune the circuit to approximate resonance with the current induced therein, and means for varying the auxiliary magnetizing current to vary the tuning of the secondary circuit.

47. The combination in an apparatus of the character described of a transforming device having two magnetic circuits, a primary and a secondary winding for each magnetic circuit, a source of auxiliary magnetizing current adapted to simultaneously energize both magnetic circuits, a source of high frequency alternating current supplying said primary windings and signaling means connected with said auxiliary current source for varying the intensity of the magnetic field in accordance with signals and correspondingly varying the amplitude of the high frequency current induced in the secondary winding.

48. The combination in an apparatus of the class described for a transforming device having two magnetic circuits, a primary and a secondary winding for each magnetic circuit, a source of auxiliary magnetizing current adapted simultaneously to energize both magnetic circuits, a source of high frequency alternating current supplying said primary windings, a circuit containing the secondary windings, the inductance capacity and resistance of said circuit being suitably proportioned to tune the circuit to approximate resonance with the current induced therein and signaling means coöperating with said auxiliary current source for varying the inductance of the said circuit and thereby varying its tuning in accordance with signals.

In testimony whereof, I have hereunto subscribed my name this twenty-third day of July, 1912.

JAMES C. ARMOR.

Witnesses:
T. THULER,
O. E. LARSON.